July 20, 1965 F. P. RENNIE 3,196,367

ALTERNATING WAVE MAGNETIC OSCILLATOR

Filed Nov. 20, 1962

INVENTOR.
FRANK P. RENNIE

BY H. H. Hulse

ATTY.

United States Patent Office 3,196,367 Patented July 20, 1965

3,196,367

ALTERNATING WAVE MAGNETIC OSCILLATOR

Frank P. Rennie, Stamford, Conn., assignor to General Time Corporation, New York, N.Y., a corporation of Delaware Filed Nov. 20, 1962, Ser. No. 239,026
8 Claims. (Cl. 331—113)

The present invention relates to magnetic oscillators and more particularly to an asymmetrical magnetic oscillator of variable pulse width intended for low frequencies.

Magnetic oscillators employing transformers having a saturable core with transistor means to drive the core alternately to opposite limits of saturation are known in the art. However, difficulty has been experienced in designing such units for asymmetrical operation at low frequencies, for example, on the order of 1 cycle per second.

It is an object of the present invention to provide a magnetic oscillator capable of producing a low frequency asymmetrical output wave consisting of long pulses separated by short pulses of different polarity and which permits adjustment of the long pulses over a wide range without affecting the width of the short pulses. It is a related object of the present invention to provide a magnetic oscillator having transistors in separate legs of the circuit for driving the core to positive and negative saturation and in which the separate legs of the circuit are isolated in a novel fashion so that adjustments made in one leg do not affect the operation of the other. It is a more specific object of the present invention to provide a magnetic oscillator having windings which are energized by respective transistors with the input circuits of the transistors being cross connected for feedback purposes but in which the idle winding is free of any load enabling the two windings to work entirely independently of one another to produce a short, accurately defined pulse width. Consquently it is an object to provide a magnetic oscillator producing a highly asymmetrical output wave and intended for use where it is desired to maintain the short output pulse constant while varying the longer output pulse over a wide range.

It is another object of the present invention to provide a magnetic oscillator intended for asymmetrical operation at low frequencies and which maintains its adjusted frequency with a high degree of stability. It is a more detailed object to provide a low frequency oscillator which is light in weight and extremely compact as compared to prior oscillators intended for low frequency use. Finally it is an object to provide a low frequency magnetic oscillator which is capable of accurate and stable operation but which nevertheless may be constructed at low cost employing standard, readily available circuit components.

Other objects and advantages of the invention will become apparent upon reading the attached detailed description and upon reference to the drawing in which.

While the invention has been described in connection with a preferred embodiment, it will be understood that I do not intend to be limited to the embodiment shown but intend to cover the various modified and equivalent circuits included within the spirit and scope of the appended claims.

Figure 1:
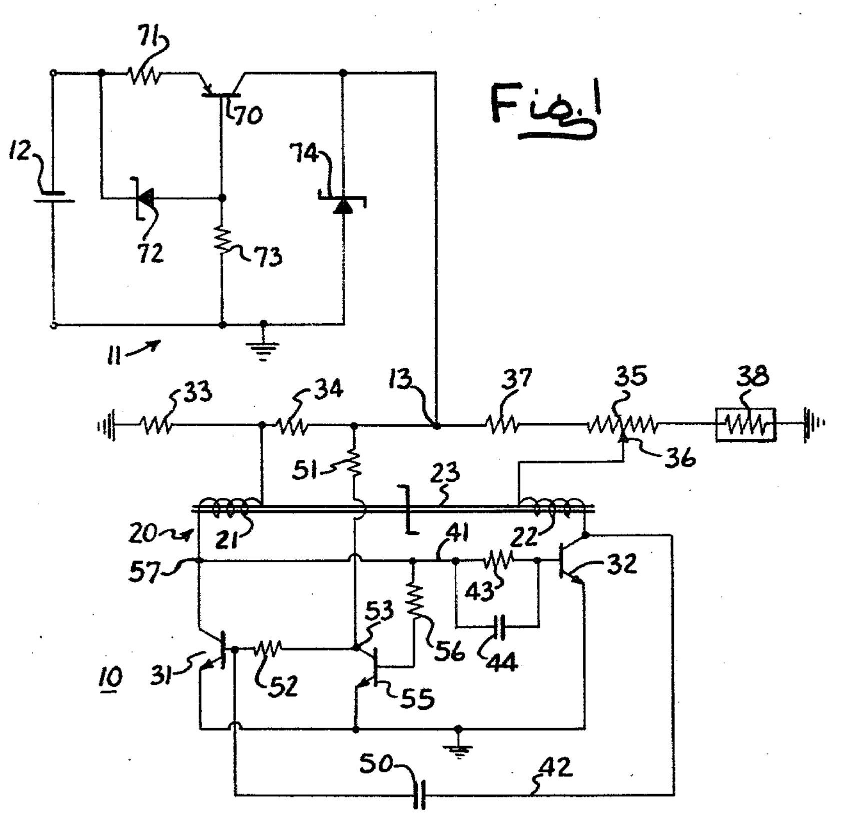
FIGURE 1 is a schematic diagram of an oscillator constructed in accordance with the present invention.
Figure 2:
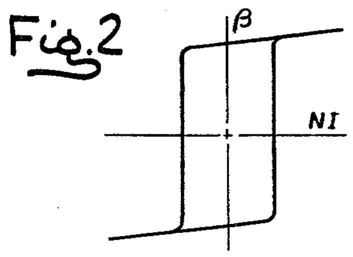
FIG. 2 shows the form of the hysteresis loop which characterizes the core material used in FIG. 1.

Turning now to FIG. 1, there is shown a magnetic oscillator circuit 10 having a constant voltage power supply 11 fed from a battery or similar voltage source 12. Thus regulated voltage is supplied to a central supply terminal 13 on the oscillator. The oscillator employs a saturable transformer 20 having a pair of windings 21, 22 wound about a core 23. The core is formed of a readily saturated magnetic material having a generally rectangular hysteresis loop, as set forth in FIG. 2, such material being commercially sold by G. L. Electronics Co. under the name "Orthonik Type P1040." For driving the core into its opposite conditions of saturation which may, for convenience, be termed "positive" and "negative" saturation, the windings 21, 22 are energized by transistors 31, 32.

The windings, as shown, are connected in series with the collector terminals, while the emitter terminals are grounded, Preferably, NPN transistors are used of the type commercially identified as 2N717. The winding 21 is supplied with voltage via a voltage divider which consists of resistors 33, 34 connected between the terminal 13 and ground. The winding 22 is connected to a voltage divider consisting of a potentiometer 35 having a slider 36 and resistors 37, 38, respectively, completing the circuit to the power source and ground. The purpose of the potentiometer 35 will become clear as the discussion proceeds.

For causing the transistors to conduct alternately to drive the transformer core to its opposite conditions of saturation, feedback connections are provided. The first feedback connection indicated at 41 couples the output of the transistor 31 to the input, or base, of the transistor 32, while the second feedback connection, indicated at 42, serves to connect the output of the transistor 32 to the input, or base, of the transistor 31. In the illustrated embodiment of the invention the feedback connection 41 is formed by a series resistor 43 shunted by a capacitor 44.

In accordance with the present invention, at least one of the feedback connections, here the connection 42, includes a coupling capacitor capable of applying a current-initiating voltage pulse to the input circuit of the transistor 31 when the core is saturated by the winding 22, with means for supplying conductive bias or input current to the transistor from an auxiliary source until the core is saturated in the opposite direction. In the present instance a capacitor 50 having a low capacitance on the order of 470 mmf. provides adequate coupling in the feedback connection 42 while preventing any actual or sustained flow of input current. More specifically in accordance with the invenion, base current for biasing the transistor 31 for flow of collector current is supplied, not from the winding 22 as in conventional magnetic oscillator circuits, but rather from the voltage source 11 and under the control of an auxiliary transistor which is switched when saturation has been achieved.

In the present instance means are provided for biasing the transistor 31 for conduction and the auxiliary transistor turns off the bias, when appropriate, by forming a short circuit to ground. Thus, turning to the input or base circuit of the transistor 31, it will be noted that current for biasing the transistor 31 to conduct is fed from the power input terminal 13 through a first resistor 51 and a second resistor 52, defining a central bias control terminal 53. The bias control terminal 53 is connected to the output circuit of an auxiliary transistor 55 which may be of the same type as the transistors previously referred to. For the purpose of causing the transistor 55 to perform its shorting effect when the core has been saturated by the winding 21, the base of the auxiliary transistor is coupled to the lower end 57 of the winding 21 by means of an input or series resistor 56. Thus, the achieving of saturation by the winding 21 is utilized to perform two separate functions, prompt turn-off of the transistor 31 and the turning on of the transistor 32 for completion of the operating cycle. The number of turns in the winding 22 preferably exceeds the number of turns in the winding 21 by a large factor to produce an asymmetrical output wave consisting of a succession of long and short pulses.

Figure 3:
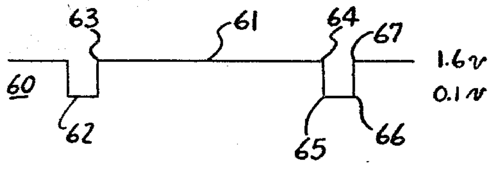
FIG. 3 shows the output wave shape taken from the collector of the lefthand transistor.

In order to understand the operation of the circuit thus far described reference is made to FIG. 3 which shows a typical output wave 60, as observed at the collector terminal of the transistor 31, consisting of long pulses 61 separated by short pulses 62. A typical cycle may be considered to start at point 63, at which point the transistor 31 has just turned off. Under such conditions the voltage at the lower end of the coil 21 will be substantially the same as the voltage at the upper end which may, in a practical case, be 1.6 volts positive. Such voltage, applied to the base of the auxiliary transistor 55 via the resistor 56, causes the transistor to be turned on thereby connecting the bias control terminal 53 effectively to ground and removing conductive bias from the transistor 31. At the same time, positive voltage is applied via the feedback connection 41, through resistor 43, to the base terminal of the opposite transistor 32, turning this transistor on so that current begins to flow through the transformer winding 22.

Assuming that the device has been designed to produce a long half cycle, say, on the order of one second, the winding 22 has a large number of turns, on the order of 7,000 turns, which, wound about the core 23, offer high inductive reactance. Thus, build-up of current in the coil takes place at a slow rate. During the long time interval the voltage at the collector of the transistor 32 remains at a low level. When saturation finally occurs, at point 64 in FIG. 3, the voltage drop through the coil 22 is sharply reduced resulting in an increase in voltage at the collector terminal. The voltage drop across the transistor output circuit is forced to rise since the base current is insufficient to maintain it at the former low level.

The sudden positive-going voltage applied to the capacitor 50 in the feedback connection 42 applies a positive pulse to the base or input terminal of the transistor 31. While it is true that the auxiliary transistor 55 is "on" constituting a short circuit to ground, the resistor 52 provides sufficient voltage drop so that the positive pulse at the base terminal is capable of initiating current flow in the output circuit. Because of the inductive reactance of the winding 21, a voltage drop appears across such winding swinging the lower end 57 of the winding to near ground potential. This drop in voltage appearing at the base terminal of the auxiliary transistor 55 causes it to turn off thereby removing the short circuit and permitting full positive bias to be applied to the base of the transistor 31 so that the current flow, initiated by the pulse received through the capacitor 50, continues. Simultaneously, the drop in voltage in the feedback connection 41 applied to the base of the transistor 32 causes the latter to become nonconducting. The switch between conduction and nonconduction occurs with great rapidity and the output voltage taken from the collector of transistor 31 thus immediately goes from the value shown at 64 in FIG. 3 to that shown at 65. Assuming that a short half cycle is desired, the winding at 21 is wound with fewer turns than the winding at 22, for example, on the order of 500 turns and the applied voltage is sufficiently high so that substantial current is conducted through the winding causing completion of saturation in a short time interval as indicated at 66 in FIG. 3 which may be on the order of 50 milliseconds. Just as in the case of the earlier discussed transistor 32, the base current of transistor 31 is insufficient to maintain a low voltage across its output circuit after saturation with the result that the voltage at the lower end of the coil 21 rises, which voltage is applied through the feedback connection 41 to turn on both the transistor 32 and the auxiliary transistor 55. The latter short circuits the base current of the transistor 31, immediately turning off the current flow in the output circuit as shown at 67 in FIG. 3 thereby completing an output cycle.

As previously noted, when the transistor 32 is "off" no current flows through the transformer winding 22, not even the base current for transistor 31 since the latter is supplied through its own bias circuit 51, 52 directly from the voltage source. As a result there is no residual current flow in the winding 22 which would tend to oppose the resetting action of the current in winding 21. It will be understood that even a small flow of current in the winding 22 would have a substantial inhibiting effect upon reset because of the large number of turns in such winding. In short, the transistor 31 and winding 21 are capable of resetting the core in a short and accurately defined space of time which may, in a practical case, be on the order of 50 milliseconds.

In accordance with one of the aspects of the invention, means are provided for varying the length of the half cycle of conduction of the transistor 32, in other words for varying the length of the portion 61 of the wave of FIG. 3. This is accomplished by varying the voltage applied to the upper end of the coil 22 and which is fed from the slider 36 of potentiometer 35. Changing the amount of voltage applied to the winding 22, it may be noted, has no effect whatsoever upon the base circuit of the transistor 31 because of the latter's independent bias supply. Consequently, it is possible to vary the length of the half wave 61 over a wide ratio, on the order of 4:1, without affecting stability or the length of the pulse 62. As a result, the present circuit has particular utility where it is desired to produce an asymmetrical wave in which long pulses are separated by short "marker" pulses and where the long pulses may be varied over a wide range without changing the length of the marker pulses.

In accordance with one of the more detailed features of the present invention, temperature stability is achieved by employing a resistor having an appropriate temperature coefficient in the voltage divider network which supplies voltage to the transistor 32. In the present instance, the resistor 38 is formed of wire having a positive temperature coefficient of resistance available in the trade as "Balco" wire. This tends to increase the voltage at the slider 36 upon increase in temperature, shortening the period and cancelling the natural tendency for the period to increase with higher temperature.

In the above discussion it has been assumed that a constant voltage is maintained at input terminal 13 in spite of fluctuations of voltage at the battery 12. Any suitable voltage regulating circuit may be used but the network 11 has been found to be particularly effective. It includes a transistor 70 having an emitter resistor 71 and a zener 72 across the base-emitter circuit. Any excess voltage occurs as a voltage drop across resistor 73 which supplies current to the zener. A second zener 74 having a voltage rating which corresponds to the desired input voltage is connected from the input terminal 13 to ground. Such circuit is capable of maintaining an exact 12 volts at the input terminal 33 as long as the supply battery 12, which may have a nominal voltage of 28 volts is within the range of, say, 13 to 28 volts. By way of example and to assist in putting the present invention to use, it will be helpful to specify the circuit constants which have been employed in a practical case:

| | |
|---|---|
| 31, 32, 55 | Transistors type 2N717. |
| 33 | 150 ohms. |
| 34 | 1,000 ohms. |
| 35 | 500 ohms. |
| 37 | 4,700 ohms. |
| 38 | 25 ohms, temp. coefficient per ° C. |
| 43 | 56,000 ohms. |
| 44 | 0.022 mf. |
| 50 | 470 mmf. |
| 51 | 470,000 ohms. |
| 52 | 12,000 ohms. |

The invention has particular utility in magnetic amplifiers intended to produce a highly asymmetrical wave, where residual current in the larger winding may inhibit the resetting action of the opposite winding and where it is desirable to vary the voltage applied to the larger winding. However, the invention is not necessarily limited thereto but may be employed wherever it is desired to provide isolation between the two legs of a magnetic oscillator circuit. Thus if desired the transistor 32 may also be provided with an auxiliary transistor and independent bias circuit such as that shown in 51, 52, 55, in which case a coupling capacitor, such as the capacitor 50, would be substituted in the feedback connection 41 to initiate the current flow. If this were done means could also be provided for adjusting the voltage applied to the winding 21 and transistor 31 to adjust the period of the latter.

I claim as my invention:

1. In a magnetic oscillator the combination comprising, a saturable transformer including a core having a generally rectangular hysteresis characteristic with first and second windings thereon, a source of voltage, first and second transistors each having an input circuit and an output circuit, the output circuits being connected between the transformer windings and the source for controlling flow of current through the windings from said source thereby to drive the transformer core to the conditions of positive and negative saturation respectively, a first feedback circuit connected between the output circuit of the first transistor and the input circuit of the second and a second feedback circuit connected between the output circuit of the second transistor and the input circuit of the first so that the transistors are caused to conduct alternately as the core attains opposite conditions of saturation, said second feedback circuit including a capacitor for passing a voltage pulse upon achieving of core saturation by the second transistor thereby initiating conduction in the first transistor and for inhibiting continued current flow, and auxiliary means coupled to the input circuit of the first transistor for biasing the first transistor for continued conduction following the pulse until a condition of core saturation in the opposite direction is achieved by the first transistor and for rendering the first transistor non-conductive when core saturation in the opposite direction is achieved.

2. In a magnetic oscillator the combination comprising, a saturable transformer including a core having a generally rectangular hysteresis characteristic with first and second windings thereon, a source of voltage, first and second transistors each having an input circuit and an output circuit, the output circuits being connected between the transformer windings and the voltage source for controlling flow of current from the source through the windings, a first feedback circuit connected between the output circuit of the first transistor and the input circuit of the second and a second feedback circuit connected between the output circuit of the second transistor and the input of the first so that the transistors are caused to conduct alternately to drive the core to a condition of positive and negative saturation, said second feedback circuit including means for passing a voltage pulse upon achieving of saturation by the second transistor for initiating conduction in the first transistor without any current drain through the second winding, means for varying the voltage applied to the second transistor to vary the period of conduction thereof, and auxiliary means for supplying current to the input circuit of the first transistor subsequent to conduction being initiated therein so that the first transistor is maintained conductive and for rendering the first transistor non-conductive when core saturation in the opposite direction is achieved, the auxiliary means allowing for changes to be made in the conduction period of the second transistor without affecting the condition of the first transistor.

3. In a magnetic oscillator the combination comprising, a saturable transformer including a core having a generally rectangular hysteresis characteristic and first and second windings thereon, a source of vlotage, first and second transistors each having an input circuit and an output circuit, the output circuits being connected between the transformer windings and the voltage source for controlling the flow of current through the windings from said source for driving the transformer core to the conditions of positive and negative saturation respectively, a first feedback circuit connected between the output circuit of the first transistor and the input circuit of the second and a second feedback circuit connected between the output circuit of the second transistor and the input circuit of the first so that the transistors are caused to conduct alternately as the core attains opposite conditions of saturation, said second feedback circuit including a capacitor so that a conduction-initiating voltage pulse is transmitted therethrough to the first transistor upon saturation being achieved by the second transistor, and means including an auxiliary transistor interposed between the output and input circuits of the first transistor for causing the first transistor to be biased for continued conduction subsequent to conduction being initiated therein until saturation in said core is achieved in the opposite direction by said first transistor and for rendering said first transistor non-conductive when core saturation in the opposite direction is achieved.

4. In a magnetic oscillator the combination comprising a saturable transformer including a core having a generally rectangular hysteresis characteristic with first and second windings thereon, a source of voltage, first and second transistors each having an input circuit and an output circuit, the output circuits being connected between the transformer windings and the voltage source for controlling the flow of current through the windings from said voltage source for driving the transformer core to the conditions of positive and negative saturation respectively, a first feedback circuit connected between the output of the first transistor and the input of the second and a second feedback circuit connected between the output of the second transistor and the input of the first so that the core attains opposite conditions of saturation, means including a series resistor for normally biasing the first transistor for conduction, means including an auxiliary transistor having an input circuit connected to the output circuit of the first transistor and having an output circuit connected to the input circuit of the first transistor for disabling the bias means when saturation of the core is achieved by the first transistor so that the first transistor is rendered non-conductive, said second feedback circuit including a series capacitor so that when saturation is achieved by reason of current flowing through the second transistor, a conduction-inducing pulse of voltage is transmitted through the capacitor to the input of the first transistor causing the first transistor to be rendered conductive and thus causing the auxiliary transistor to be rendered non-conductive so that the biasing means is rendered effective to prolong conduction of the first transistor until the transformer core is saturated in the opposite direction whereupon the second transistor is rendered conductive through said first feedback circuit.

5. In a magnetic oscillator the combination comprising a saturable transformer including a core having a generally rectangular hysteresis characteristic with first and second windings thereon, a source of voltage, first and second transistors each having an input circuit and an output circuit, the output circuits being connected between the transformer windings and the voltage source for controlling flow of current through the winding from the voltage source, a first feedback circuit connected between the output of the first transistor and the input of the second and a second feedback circuit connected between the output of the second transistor and the input of the first so that the transistors conduct alternately for driving the core between positive and negative saturation at a regular repetitive rate, means for supplying the current to the input circuit of at least said first transistor from said source independent of current flow through the opposite winding, and adjustable means interposed between the voltage source and the output circuit of the second transistor for varying the effective voltage applied to the second winding thereby to vary the period of conduction of the second transistor while the period of conduction of the first transistor remains constant.

6. In a magnetic oscillator the combination comprising a saturable transformer including a core having a generally rectangular hysteresis characteristic with first and second windings thereon, a source of voltage, first and second transistors each having an input circuit and an output circuit, the output circuits being connected between the respective transformer windings and the voltage source for controlling the current flow from the source through the windings, feedback circuits connected between the output of each one of the transistors and the input of the other so that the transistors tend to conduct alternately to drive the core to the condition of positive and negative saturation respectively, the second transformer winding having a substantially greater number of turns than the first winding so that the periods of conduction for the transistors are different, and means for supplying current to the input of the first transistor independently of any current flow in the second winding.

7. In a magnetic oscillator the combination comprising a saturable transformer including a core having a generally rectangular hysteresis characteristic with first and second windings theron, a source of voltage, a pair of transistors each having an input circuit and an output circuit, the output circuits being connected between the respective transformer windings and the source of voltage for controlling the flow of current from the source to the windings, feedback circuits connected between the output of each transistor and the input of the opposite transistor so that the transistors conduct alternately for driving the core to positive and negative saturation, said second transformer winding having at least several times the number of turns of the first winding, and means including voltage varying means associated with the second winding for varying the period of conduction of the second transistor while leaving the period of the first transistor unchanged.

8. In a magnetic oscillator the combination comprising a saturable transformer including a core having a generally rectangular hysteresis characteristic with first and second windings thereon, a source of voltage, a pair of transistors each having an input circuit and an output circuit, the output circuits being connected between the respective transformer windings and the source of voltage for controlling the flow of current from the source to the windings, feedback circuits connected between the output of each transistor and the input of the opposite transistor so that the transistors conduct alternately for driving the core to positive and negative saturation, said second transformer winding having at least several times the number of turns of the first winding, means including a potentiometer associated with the second winding for varying the effective voltage applied to the second winding and thus for varying the period of conduction of the second transistor while leaving the period of the first transistor unchanged, and a temperature responsive resistor in series with one leg of the potentiometer for compensating for changes in ambient temperature.

References Cited by the Examiner

UNITED STATES PATENTS

| | | | |
|---|---|---|---|
| 2,912,653 | 11/59 | Tillman | 331—113 |
| 2,959,745 | 11/60 | Grieg | 331—113 |

OTHER REFERENCES

Electronics, July 24, 1959, pages 54–56.

ROY LAKE, *Primary Examiner.*

JOHN KOMINSKI, *Examiner.*